United States Patent
Hollar (10) Patent No.: US 11,637,586 B2
(45) Date of Patent: *Apr. 25, 2023

(54) SYSTEMS AND METHODS FOR WIRELESS ATOMIC CLOCK SYNCHRONIZATION USING ULTRA WIDEBAND (UWB) PULSE TRAINS

(71) Applicant: Wiser Systems, Inc., Raleigh, NC (US)

(72) Inventor: Seth Edward-Austin Hollar, Raleigh, NC (US)

(73) Assignee: Wiser Systems, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,043

(22) Filed: Dec. 20, 2021

(65) Prior Publication Data

US 2022/0116071 A1  Apr. 14, 2022

Related U.S. Application Data

(63) Continuation of application No. 17/196,073, filed on Mar. 9, 2021, now Pat. No. 11,206,056.

(60) Provisional application No. 62/987,418, filed on Mar. 10, 2020.

(51) Int. Cl.
*H04B 1/71* (2011.01)
*H04B 1/7183* (2011.01)

(52) U.S. Cl.
CPC ................................. *H04B 1/7183* (2013.01)

(58) Field of Classification Search
CPC ............ H04B 1/7183; H04W 56/0015; H04W 56/006

See application file for complete search history.

(56) References Cited

U.S. PATENT DOCUMENTS

| | | | |
|---|---|---|---|
| 8,497,802 B2 | 7/2013 | Ling | H04L 7/0079 342/387 |
| 10,462,762 B2 | 10/2019 | Hollar | |
| 11,245,404 B2* | 2/2022 | Dahle | H03L 7/0996 |
| 2007/0194987 A1 | 8/2007 | Fedora | |
| 2009/0213005 A1 | 8/2009 | Fedora | G01S 5/0226 342/357.4 |
| 2011/0199262 A1 | 8/2011 | Karaoguz | G01S 19/25 342/357.64 |
| 2022/0239541 A1* | 7/2022 | Moghaddam | H04L 27/2663 |

* cited by examiner

*Primary Examiner* — Dac V Ha
(74) *Attorney, Agent, or Firm* — Stanek Lemon Crouse & Meeks, PA (57) ABSTRACT

Some embodiments of the present inventive concept provide a system for maintaining clock synchronization including an ultra-wideband (UWB) transmitting system and a UWB receiving system. The high precision input clock at the transmitting system produces a high precision clock frequency. A message is sent from the transmitting system including a transmit time of the message in UWB transmitter clock units. The message is received at the UWB receiving system at an arrival time in UWB receiver clock units. A time of flight (ToF) and an oscillator offset is calculated based on the transmit time included in the message and the arrival time. A tuning register uses the calculated oscillator adjustment to adjust the low precision resonator to synchronize the low precision resonator with the high precision input clock at the UWB transmitting system.

20 Claims, 6 Drawing Sheets

SYSTEMS AND METHODS FOR WIRELESS ATOMIC CLOCK SYNCHRONIZATION USING ULTRA WIDEBAND (UWB) PULSE TRAINS

CLAIM OF PRIORITY

The present application is a continuation of U.S. application Ser. No. 17/196,073, filed Mar. 9, 2021, which claims priority to U.S. Provisional Application Ser. No. 62/987,418, filed on Mar. 10, 2020, the contents of which are hereby incorporated herein by reference as if set forth in their entirety.

FIELD

The present inventive concept relates generally to clock synchronization and, more particularly, to synchronization using ultra-wideband (UWB) pulse trains.

BACKGROUND

Atomic clocks are used to keep precise time in a myriad of applications. For example, global navigation systems (GNSs), such as global positioning systems (GPSs), use atomic clocks in satellites to precisely transmit signals for GPS receivers to determine location. Clocks and watches can more accurately keep track of time by extracting the clock signals from a GNS receiver.

However, sometimes there is a need to maintain precise timing without the cost of a high precision clock. Some conventional methods of maintaining precise timing use a cabled connection to provide a synchronization signal from a high precision clock to another device containing a low precision clock to keep it in tune. Other conventional methods may provide a continuous signal, either through a cabled connection or through the air, that the receiver can phase lock onto. These methods often require a continuous connection.

SUMMARY

Some embodiments of the present inventive concept provide a system for maintaining clock synchronization. The system includes an ultra-wideband (UWB) transmitting system including a high precision input clock that produces a high precision clock frequency; a UWB transmitter that receives the high precision clock frequency and sends a message using a transmit antenna associated with the UWB transmitter, the message including a transmit time of the message in UWB transmitter clock units; a processor in communication with the UWB transmitter; and a counter that precisely controls transmit times of message sent from the UWB transmitter. The system further includes a UWB receiving system including a UWB receiver that receives the message using a receive antenna associated with the UWB receiver from the UWB transmitter, the message being received at an arrival time in UWB receiver clock units; a memory that stores the arrival time of the message in receiver clock units; a low precision resonator that provides the arrival time in receiver clock units; a processor that calculates a time of flight (ToF) for the message based on the transmit time included in the message and the arrival time stored in the memory and calculates a oscillator adjustment for the low precision resonator based on the transmit time in the message and the stored arrival time; and a tuning register that uses the calculated oscillator adjustment to adjust the low precision resonator to synchronize the low precision resonator with the high precision input clock at the UWB transmitting system.

In further embodiments, the UWB transmitting system may further include a conversion unit that receives the high precision clock frequency in high precision clock units and converts the high precision clock units into base clock units and provides the base clock units to the processor.

In still further embodiments, the message may further include a header and an transmit identifier (TX ID) for the UWB transmitter.

In some embodiments, the UWB receiving system may further include a conversion unit that receives base clock units and converts base clock units into high precision clock units.

In further embodiments, the tuning register may be completely separate from the UWB receiver.

In still further embodiments, a base clock may have a frequency of 38.4 MHz and the high precision input clock may have a frequency of 10 MHz.

In some embodiments, the system may further include a plurality of UWB transmitters and/or receivers.

In further embodiments, the counter may have picosecond resolution.

In still further embodiments, the UWB transmitting system and the UWB receiving system may be stationary and the ToF may be calculated based on a fixed distance between the UWB transmitting system and the UWB receiving system.

In some embodiments, at least one of the UWB transmitting system and the receiving system are mobile and the ToF is calculated using two way ranging.

In further embodiments, the tuning register may adjust the low precision resonator to synchronize the low precision resonator with the high precision input clock at the UWB transmitting system by adding the transmit time in the message to the ToF to provide an arrival time in UWB transmitter clock units; and determining a difference between the arrival time in UWB transmitter clock units and the arrival time in UWB receiver clock units. The tuning register may adjust the low precision resonator using the determined difference.

In still further embodiments, the tuning register may include a proportion integral derivative (PID) controller.

In some embodiments, the tuning register may be a low pass filter combined with a proportional controller.

In some embodiments, the system may further include a transceiver between the UWB transmitting system and the UWB receiving system. The transceiver may receive the message from the UWB transmitting system and retransmit the message to the UWB receiving system.

In further embodiments, the high precision input clock may include one of an atomic clock, a Rubidium oscillator and a Cesium oscillator.

Still further embodiments of the present inventive concept provide a method for maintaining clock synchronization in a system. The system includes an ultra-wideband (UWB) transmitting system and a UWB receiving system. The method includes producing a high precision clock frequency at a high precision input clock of the UWB transmitting system; receiving the high precision clock frequency at a UWB transmitter; sending a message using a transmit antenna associated with the UWB transmitter, the message including a transmit time of the message in UWB transmitter clock units; precisely controlling transmit times of messages sent from the UWB transmitter using a counter; receiving the message at a UWB receiver of the UWB receiving system using a receive antenna associated with the UWB receiver from the UWB transmitter, the message being received at an arrival time in UWB receiver clock units; stores the arrival time of the message in receiver clock units in a memory at the UWB receiving system; calculating a time of flight (ToF) for the message based on the transmit time included in the message and the arrival time stored in the memory and an oscillator adjustment for a low precision resonator based on the transmit time in the message and the stored arrival time; and adjusting the low precision resonator using the calculated oscillator adjustment to synchronize the low precision resonator with the high precision input clock at the UWB transmitting system.

DETAILED DESCRIPTION

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. in other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, atomic clocks are used to keep precise time in a myriad of applications. For example, global navigation systems (GNSs), such as global positioning systems (GPSs), use atomic clocks in satellites to precisely transmit signals for GPS receivers to determine location. Clocks and watches can more accurately keep track of time by extracting the clock signals from a GNS receiver.

However, sometimes there is a need to maintain precise timing without the cost of a high precision clock. Some conventional methods of maintaining precise timing use a cabled connection to provide a synchronization signal from a high precision clock to another device containing a low precision clock to keep it in tune. Other conventional methods may provide a continuous signal, either through a cabled connection or through the air, that the receiver can phase lock onto. These methods often require a continuous connection.

Ultra-wideband (UWB) is a technology that allows for small time domain pulses to translate into broadband signals in the radio frequency (RF) domain. UWB is a radio technology that can use a very low energy level for short-range, high-bandwidth communications over a large portion of the radio spectrum. Some embodiments of the present inventive concept use UWB to provide an alternative to maintaining a high accuracy clock by synchronizing wirelessly with a neighboring clock. Sharp time domain pulses allow for the precise measurement of the arrival times to a receiver which in turn can be used as sync signals as will be discussed further herein with respect to FIGS. 1 through 6.

In particular, some embodiments of the present inventive concept provide methods and systems for maintaining the accuracy of an atomic clock using a low accuracy oscillator through wireless synchronization with a pulse train of UWB signals. Unlike phased locking, an uninterrupted signal is not required. Periodic pulses may be used to align the receiving clock oscillations with the atomic clock frequency.

Figure 1:
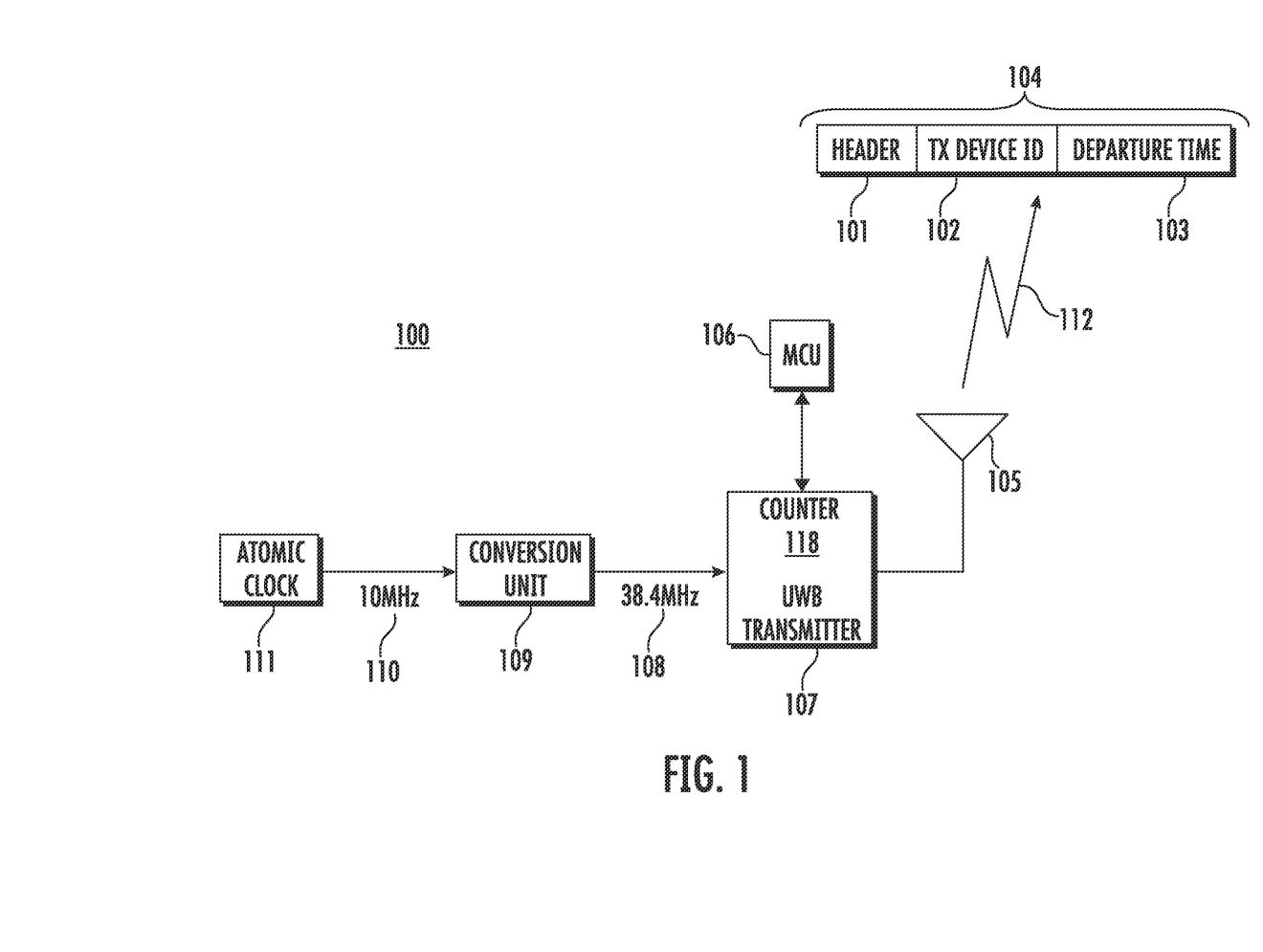
FIG. 1 is a block diagram illustrating a transmitting system in accordance with some embodiments of the present inventive concept.

Referring first to FIG. 1, a block diagram illustrating a transmitting system for use in accordance with embodiments of the present inventive concept will be discussed. It will be understood that systems for maintaining precise clock synchronization in accordance with embodiments discussed herein include both a transmitting (Tx) system and a receiving (Rx) system. As illustrated in FIG. 1, the transmitting system 100 includes a high precision input clock, for example, an atomic clock 111, a conversion unit, for example, a multiply/divide (mul/div) unit 109, a transmitter (Tx) 107, a processor, or microcontroller unit (MCU) 106, and an antenna 105. As used herein, an "high precision input clock" refers to an extremely accurate type of clock which is regulated by the vibrations of an atomic or molecular system such as Cesium or Ammonia. The atomic (high accuracy or high precision clock) clock 111 in FIG. 1 is used as the base clock. Typical atomic clocks may have an output frequency of, for example, 10 MHz. Thus, the atomic clock frequency 110 illustrated in FIG. 1 is shown as 10 MHz. However, embodiments of the present inventive concept are not limited thereto. UWB transmitters, however, may operate at a different frequency. Thus, frequency conversion may need to be performed.

In particular, as illustrated in FIG. 1, a multiply/divide unit 109 is provided that converts the frequency 110 of the high precision input clock 111 (10 MHz) to "base clock units." The multiply divide unit 109 may be provided by a combination of a multiplier circuit and/or a divider circuit, or a hybrid of the two. A multiplier circuit may be represented by a Phase-locked loop (PLL), or a harmonic resonator, or some circuit that takes advantage of the non-linear characteristics of the components to achieve higher harmonics. A divider circuit may be represented by a digital diver, a feedback analog circuit (i.e. Miller frequency divider), and/or circuits that leverage voltage controlled oscillators (VCO). Phase locked loops can also be used to create fractional multipliers, in effect achieving both a multiplication and division simultaneously. In the example illustrated in FIG. 1, the base clock units 108 is illustrated as 38.4 MHz. As used herein, "base clock units" refers to frequency in which the input clock to the UWB transceiver 107 operates. The base clock signal 108 is provided to the UWB transmitter 107. A processor (MCU) 106 coordinates and controls the UWB transmitter 107. The processor 106 can be provided by any commercially available processor as discussed further below. Within the UWB transmitter 107, the base clock units 108 may be converted to a much higher frequency, 1 GHz or greater, and an internal counter 118 may be used to precisely control transmit times from the UWB transmitter 107. For example, in some embodiments, the internal counter 118 of the UWB transmitter 107 may have picosecond resolution. The UWB transmitter 107 sends out a signal 112 using the antenna 105. The antenna may be a UWB chip antenna, a printed circuit board antenna, or an orthogonal antenna as discussed in, for example, United States Patent Publication No. 2018/0294565, entitled Ultra-Wideband (UWB) Antennas and Related Enclosures for the UWB Antennas, the content of which is hereby incorporated herein by reference as if set forth in its entirety. As shown, the signal 112 includes a message 104. The message 104 includes a header 101, the UWB transmitter's device identifier 102, and the departure/transmit time 103. It will be understood that the departure time is based on the UWB transmitter's (107) clock units. Because the UWB transmitter 107 controls the transmit time, the transmit time 103 is precomputed and set beforehand. The transmit time 103 is included in the message 104 of the transmitted signal 112.

It will be understood that the atomic clock, base clock and UWB frequencies are provided as examples herein. Thus, these clocks are not limited to the examples provided and may be any value possible without departing from the scope of the present inventive concept.

Figure 2:
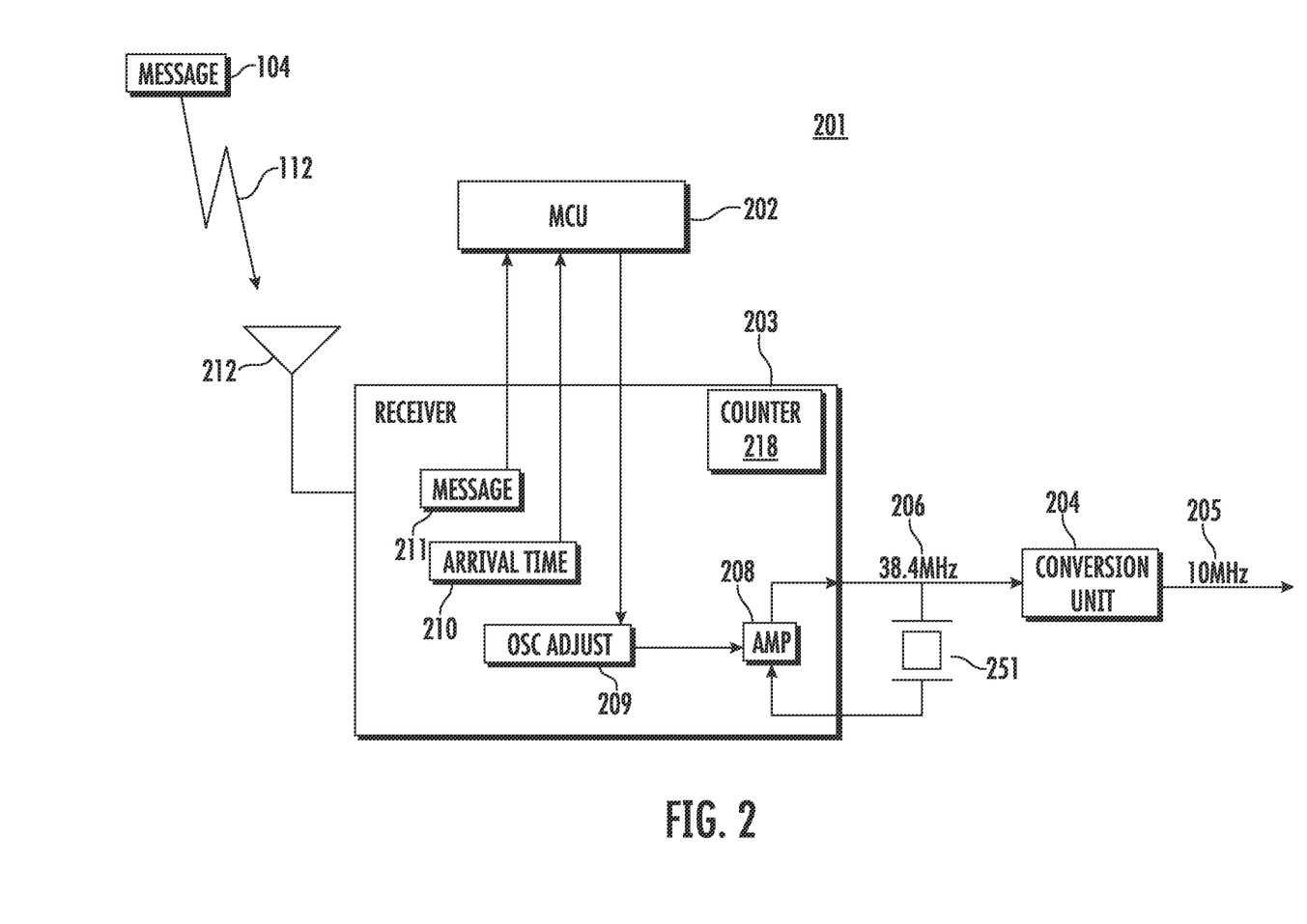
FIG. 2 is a block diagram illustrating a receiving system in accordance with some embodiments of the present inventive concept.

Referring again to FIG. 1, the signal 112 travels distance (D) and is received by a UWB receiver device. The time it takes for the signal 112 to propagate through the air is considered the time of flight (ToF) of the signal. An example receiving system 201 including a UWB receiving device 203 is illustrated in FIG. 2. As illustrated in FIG. 2, the system 201 includes the receiver device 203 having an antenna 212, an MCU 202 and a multiply/divide (conversion) unit 204. As further illustrated, the signal 112 discussed above with respect to FIG. 1 is received by the UWB receiver 203 using the antenna 212.

The UWB receiver 203 includes a memory and a tuning register 209. As illustrated, the message 104 received from the transmitted device 107 is saved and put into the memory 211 of the UWB receiver 203. The UWB receiver 203 also includes a high fidelity internal counter 218 which records the arrival time 210 of the received signal 112/message 104. The arrival time is stored in memory 210. The processor (MCU) 202 reads both the message 211 and the arrival time 210 from memory and processes the data. The UWB receiver 203 has an internal amplifier 208 (internal feedback amplifier) that interacts with an external resonator 251 to generate the base clock 38.4 MHz (206). The low precision resonator 251 is a low accuracy clock, and the microcontroller 202 uses the information from the message 104 and arrival time 210 to adjust the oscillator circuit composed of the amplifier 208 and the resonator 251. The "oscillator adjust" or tuning register 209 within the receiver 203 minutely affects the amplifier such that the frequency of the oscillator circuit can be changed by small degrees. Thus, the low accuracy clock is driven by an oscillator circuit where the UWB receiver includes an internal feedback amplifier.

Thus, the UWB transmitter device of FIG. 1 sends out a train of pulses that the UWB receiver device 203 of FIG. 2 receives. As the message 104 contents and arrival time 210 are captured, the MCU 202 updates the "oscillator adjust" register 209 to minutely alter the frequency of the oscillator circuit that generates the 38.4 MHz base clock 206. Furthermore, the 38.4 MHz base clock 206 is frequency converted to 10 MHz (205) using the multiplication/division unit 204. It will be understood that the 38.4 MHz base clock 206 of the receiver 203 is used not only for the receiver but also to maintain synchronization with the transmitter's atomic clock 111 in FIG. 1.

It will be understood that FIGS. 1 and 2 are provided as examples only and, therefore, embodiments of the present inventive concept are not limited thereto. Elements may be added or removed from these systems without departing from the scope of the present inventive concept.

Figure 3:
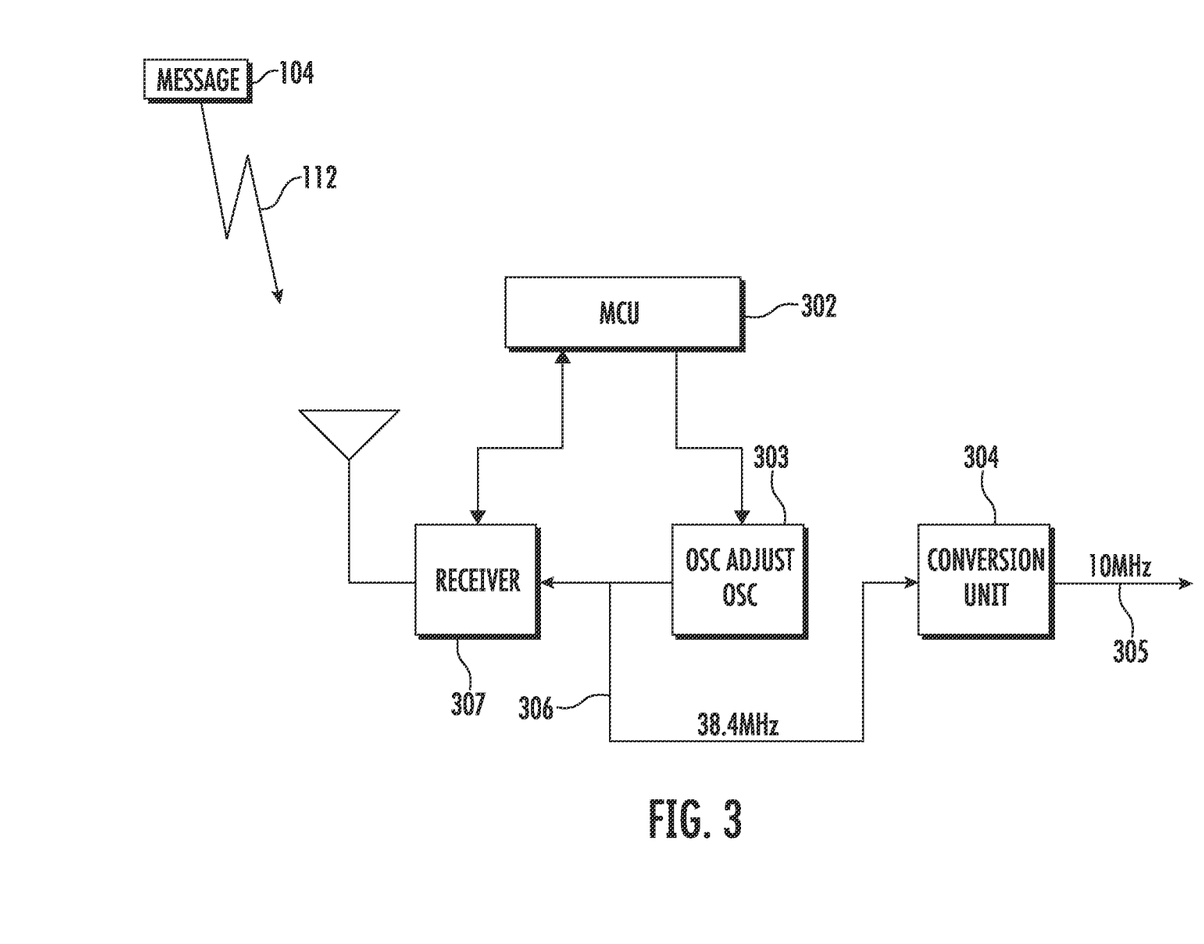
FIG. 3 is a block diagram illustrating a receiving system in accordance with some embodiments of the present inventive concept.

Referring now to FIG. 3, a more detailed diagram of a receiving system in accordance with some embodiments of the present inventive concept will be discussed. As illustrated in FIG. 3, the receiving system includes a receiver 307, an oscillator (Osc) 303, a multiply divide (conversion) (mul/div) unit 304 and an MCU 302. Similar to the system illustrated in FIG. 2, the message 104 is sent from the transmitter using signal 112, which is received by the UWB receiver 307 through the antenna, and the message contents and arrival time (not shown) are stored in the UWB receiver 307 and communicated to the processor MCU 302. In embodiments illustrated in FIG. 3, the oscillator circuit (Osc) 303 is completely external to the UWB receiver 307 and has an output 38.4 MHz base clock signal that serves both the UWB receiver 307 and forms the basis for the synchronized 10 MHz signal. As discussed above, a multiply/divide unit 304 converts the base clock 306 to the 10 MHz clock 305. The processor 302 communicates to the oscillator 303 by sending an oscillator adjust signal to minutely adjust the oscillators' frequency over time to track the atomic clock from the transmitter device from FIG. 1.

It will be understood that FIGS. 1 through 3 illustrate a base clock of 38.4 MHz and an atomic clock of 10 Mhz. As discussed above, the frequencies, 10 MHz and 38.4 MHz, are provided as examples only and should not be interpreted as the only frequencies in which this invention applies. For example, in some embodiments, the base clock frequency could be the same frequency as the atomic clock, thus reducing the complexity of the solution. In particular the multiply divide unit may be excluded.

Although embodiments of the present inventive concept discuss high accuracy oscillators as the "atomic clock" in FIGS. 1 through 3, high accuracy oscillators is used herein as a relative term. Thus, as used herein, "high accuracy oscillators" refer to oscillators that are generally more accurate than the lower accuracy oscillators that are trying to synchronize with it.

Figure 4:
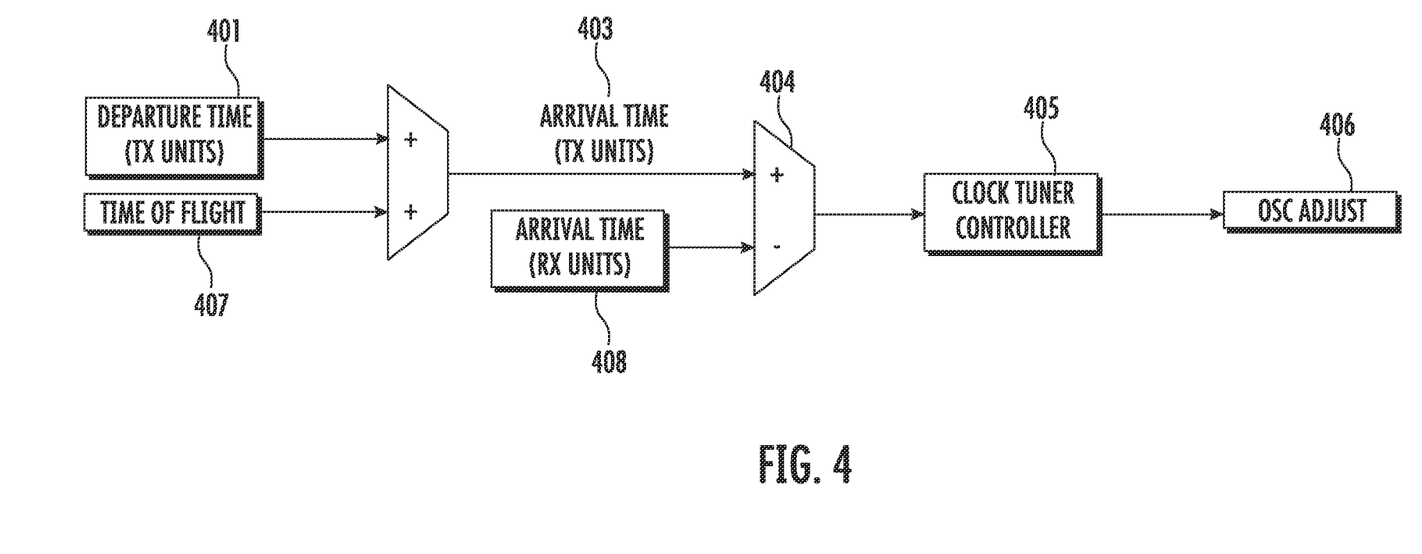
FIG. 4 is a diagram illustrating operation for tuning clocks in accordance with some embodiments of the present inventive concept.

Referring now to FIG. 4, operations for adjusting (tuning) the oscillator's frequency in accordance with some embodiments of the present inventive concept will be discussed. This process may be used in embodiments where the oscillator circuit is either part of the UWB receiver or completely separate. As discussed above, the processor (MCU) obtains both the message contents and the arrival time of the transmitted message. The contents of the message include the departure time (in transmitter clock units) as well. The processor needs to know the Time of Flight (ToF) that the signal has taken to travel from the transmitter to the receiver. If the transmitter and receiver are immobile and their locations are known beforehand, the time of flight can be calculated based on the known distance and communicated to the receiver beforehand. Other methods for determining the time of flight (ToF) could be used without departing from the scope of the present inventive concept. For example, a laser range finder could be used to determine distance or two UWB transceivers can perform message exchanging to determine a time of flight distance.

As illustrated in FIG. 4, the time of flight 407 is added to the departure time (in transmitter units) 401 to yield the arrival time (in transmitter units) 403. The difference is taken between the arrival time (in transmitter units) 403 and the arrival time (in receiver units) 408. This difference calculated by unit 404 is fed into the Clock Tuner Controller 405. In operation, a constant stream of messages will be sent from the transmitter to the receiver, and the clock tuner controller 402 will receive a sequence of these arrival time differences over time. The Clock Tuner Controller 405 adjusts the oscillator through the "oscillator adjust" input 406. The goal of the Clock Tuner Control is to get the arrival time differences to be zero or nearly zero over time. In some embodiments, a control algorithm may be provided by a proportional integral derivative (PID) controller to adjust the UWB receiver's oscillator to be synchronized with the transmitter's atomic clock. In some embodiments, a low pass filter combined with a proportional controller may be used.

In some embodiments, the receiver oscillator frequency can be adjusted through changes in values of the circuit which include resistors, capacitors, inductors. In further embodiments, the receiver oscillator frequency can be adjusted by adjusting the operating voltage of the amplifier.

Figure 5:
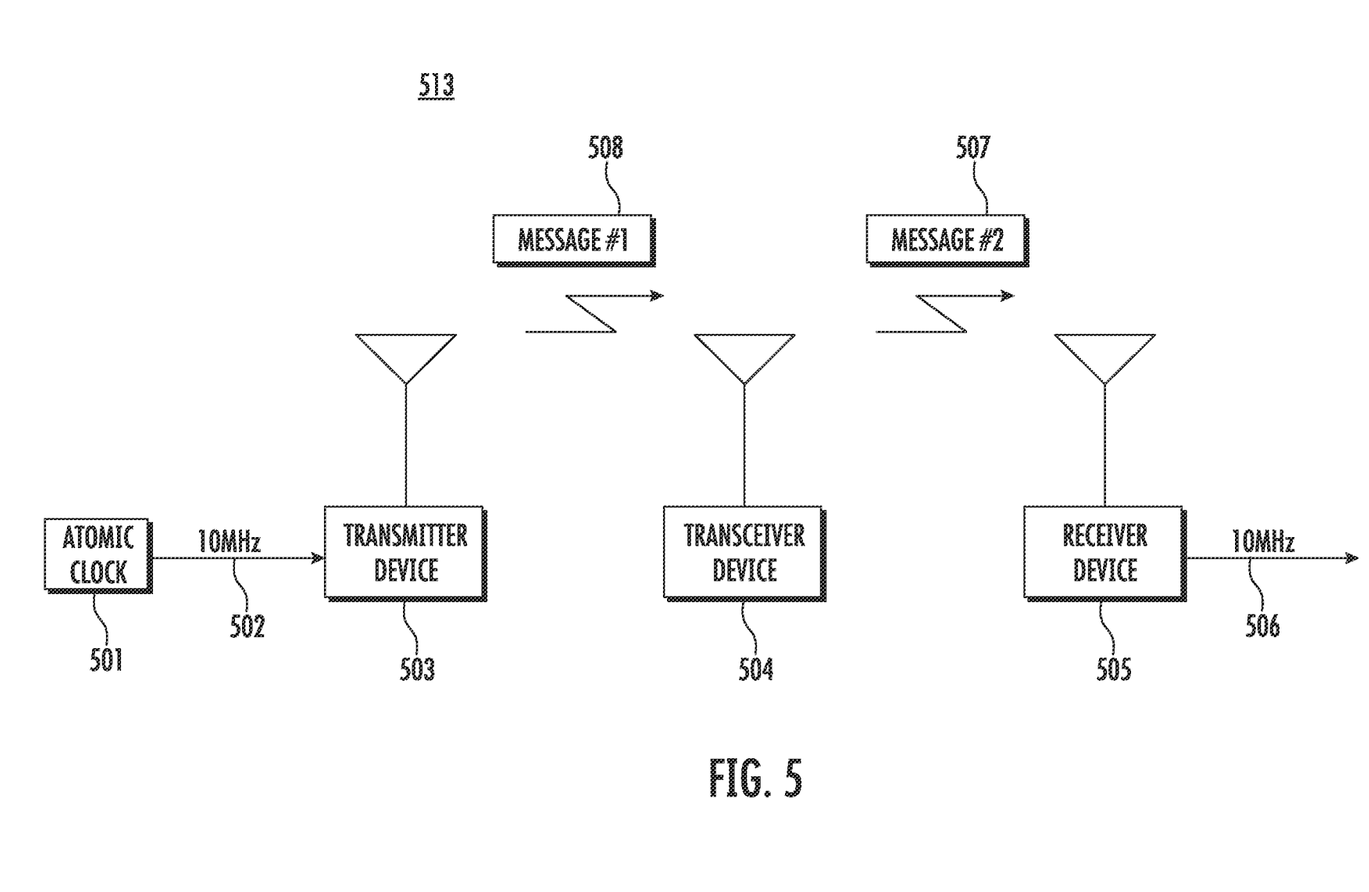
FIG. 5 is a diagram of system including multiple transmitting devices in accordance with some embodiments of the present inventive concept.

Embodiments of the present inventive concept not only maintain precise timing wirelessly between two wireless devices but maintain precise timing through multiple wireless devices. Referring now to FIG. 5, a system 513 including multiple transmitter devices will be discussed. As illustrated, the system 513 includes an atomic clock 501, two transmitter devices 503 and 504 and a receiver device 505, each of the transmitter devices 503 and 504 and the receiver device 505 having associated antenna. The system 513 is provided for example only and more or less of each type of device may be included in the system 513 without departing from the scope of the present inventive concept. As illustrated, the transmitter device unit 503 takes in the atomic clock signal 502 from the atomic clock 501 and generates message #1 including details as discussed above. Instead of going to the final recipient device, the message #1 is sent to transceiver device 504. The transceiver device 504 receives Message #1 and, as discussed above, extracts the departure time from the message and determines its arrival time. Again, the time of flight between the transmitter device 503 and the transceiver device 504 are known.

In some embodiments, the transceiver device does not have the ability to adjust its own oscillator. Instead, it simply sends out a new message (message #2) 507 with the departure time recalculated to be based off the transmitter's time units. Similar methods for retransmitting of synchronization messages are discussed in, for example, U.S. Pat. No. 10,462,762B2 to Hollar entitled Methods for Synchronizing Multiple Devices and Determining Location Based on the Synchronized Devices, the contents of which is hereby incorporated herein by reference as if set forth in its entirety.

In some embodiments, a transceiver can behave as a receiver device and transmitter device combined. In these embodiments, the multiply/divide unit may not be included on the oscillator output, but a method of tuning/adjusting its own base clock may be included. For example, there may be an internal amplifier 208 which can be tuned (FIG. 2) or an external oscillator with an oscillator-adjust interface (FIG. 3) may be used to tune the oscillator.

To understand the impact of the synchronization, however, it is important to understand the difference between the accuracy of different types of resonators. Frequency accuracy (or tolerance) refers to the relative accuracy of a resonator and can be referred to in terms of parts per million (ppm) parts per million (ppb), or more simply as an exponential format, i.e., 1 ppm=$1.0E^{-6}$, and 1 1 ppb=$1.0E^{-9}$. For example, a frequency accuracy of $1.0E^{-6}$ for a 100 MHz resonator has a frequency within the range of 100 Mz+/−100 Hz. Typical quartz resonators can have accuracy on the order of $1E^{-6}$ parts. Temperature controlled quartz resonators can have accuracy a bit better of $1E^{-7}$. Chip scale atomic clocks can have accuracy on the order of $1E^{-11}$. Rubidium oscillators get better at $1E^{-12}$, with Cesium oscillators ranging from $1E^{-13}$ to $1E^{-15}$.

It will be understood that some embodiments of the present inventive concept have limitations. For example, the receiver device could use a typical quartz resonator with accuracy of $1E^{-6}$ and use a chip scale atomic clock with an accuracy of $1E^{-11}$. The UWB transmitter device sends out pulses once every one second. In these embodiments, since the update pulses are once every second, timing of the quartz resonator could drift up to 1.0 microsecond between updates. Long term, however, it would not be more than 1.0 microsecond off from the transmitter's atomic clock as long as a reliable pulse train of messages is received.

Generally parameters can be controlled to further reduce drift. Compensating for temperature or even controlling temperature can reduce fluctuations. In some embodiments, the Clock Tuner Controller 405 in FIG. 4 could also account for temperature to better predict drift of the resonator and compensate, accordingly.

Voltage controlled oscillators are used to control frequency of an oscillator but are often designed to vary through a large frequency. Using the quartz resonator example, the tunable amplifier for the oscillator needs to control a quartz oscillator by less than $1E^{-6}$ off its base frequency. Such small variables generally do not require immense changes in the circuit oscillator. Changing the operating voltage of the amplifier by a few millivolts could possibly change the characteristics of the circuit more than the intended $1E^{-6}$ change in frequency of the oscillator circuit. In fact, parameters should be controlled as much as possible to keep the signal stable. Under controlled conditions and then with intentional variations on circuit parameters, i.e., resistance, capacitance, inductance and the like, the operating frequency can be incrementally manipulated as needed.

The contents of United States Patent Publication No. 2007/0194987A1 entitled Systems and methods for a high precision time of arrival ultra-wideband positioning system to Fedora and U.S. Pat. No. 10,462,762B2 entitled Methods for synchronizing multiple devices and determining location based on the synchronized devices to Hollar are incorporated herein by reference as if set forth in their entirety.

Figure 6:
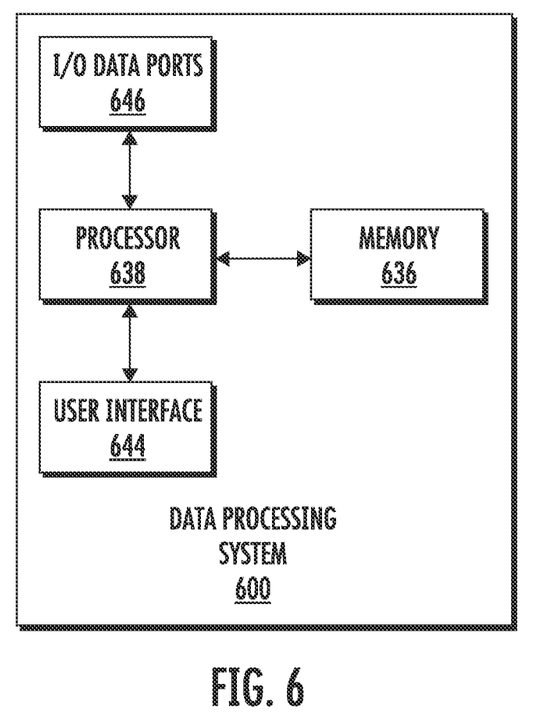
FIG. 6 is a block diagram of a data processing system that may be used in accordance with some embodiments of the present inventive concept.

Embodiments of the present inventive concept manipulate data to calculate various parameters. Accordingly, some sort of data processing (processor/MCU discussed above) is needed to create and store the data. FIG. 6 is a block diagram of an example of a data processing system 600 suitable for use in the systems in accordance with embodiments of the present inventive concept. The data processing may take place in any of the devices (or all of the devices) in the system without departing from the scope of the present inventive concept. As illustrated in FIG. 6, the data processing system 600 includes a user interface 644 such as a keyboard, keypad, display, touchpad, voice activation circuit or the like, I/O data ports 646 and a memory 636 that communicates with a processor 638. The I/O data ports 646 can be used to transfer information between the data processing system 600 and another computer system or a network. These components may be conventional components, such as those used in many conventional data processing systems, which may be configured to operate as described herein.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A system for maintaining clock synchronization, the system comprising:
    an ultra-wideband (UWB) transmitting system including:
        a high precision input clock that produces a high precision clock frequency;
        a UWB transmitter that receives the high precision clock frequency and sends a message using a transmit antenna associated with the UWB transmitter, the message including a transmit time of the message in UWB transmitter clock units;
        a processor in communication with the UWB transmitter; and
        a counter that precisely controls transmit times of message sent from the UWB transmitter; and
    a UWB receiving system including:
        a UWB receiver that receives the message using a receive antenna associated with the UWB receiver from the UWB transmitter, the message being received at an arrival time in UWB receiver clock units;
        a low precision resonator that provides the arrival time in receiver clock units;
        a processor that calculates an oscillator adjustment for the low precision resonator based on the transmit time in the message and the arrival time; and
        wherein the processor of the UWB receiving system further uses the calculated oscillator adjustment to adjust the low precision resonator to synchronize the low precision resonator with the high precision input clock at the UWB transmitting system.

2. The system of claim 1, wherein the low precision resonator is driven by an oscillator circuit and wherein the UWB receiving system includes an internal feedback amplifier.

3. The system of claim 2, wherein the UWB receiving system further includes a register that adjusts an amplifier associated with the oscillator circuit to adjust a frequency of the low precision resonator.

4. The system of claim 2, wherein the oscillator circuit is external to the UWB receiving system.

5. The system of claim 4, wherein the oscillator circuit communicates with the processor of the UWB receiving system and receives instructions from the processor of the UWB receiving system to adjust a frequency of the oscillator circuit.

6. The system of claim 5:
    wherein the processor of the UWB receiving system is further configured to calculate an updated oscillator adjustment for the low precision resonator based on the transmit time in the message, the arrival time of the message and captured transmissions associated therewith; and
    wherein the updated oscillator adjustment is used to adjust the low precision resonator such that low precision resonator remains synchronized with the high precision input clock at the UWB transmitting system.

7. The system of claim 2, wherein a temperature of the oscillator circuit is controlled to reduce fluctuations of the oscillator circuit.

8. The system of claim 2, wherein the oscillator circuit is one of a micro-electromechanical systems (MEMS) resonator, quartz resonator and a temperature controlled resonator.

9. The system of claim 2, wherein the oscillator circuit is adjusted based on changes in values of elements of the oscillator circuit, the elements of the oscillator circuit comprising at least one of a resistor, a capacitor and an inductor.

10. The system of claim 2, wherein a frequency of the oscillator circuit is adjusted by adjusting an operating voltage of the internal feedback amplifier.

11. The system of claim 1, wherein the processor of the UWB receiving system controls tuning of the low precision resonator and synchronizes the low precision resonator with the high precision input clock at the UWB transmitting system by:
    adding the transmit time in the message to provide an arrival time in UWB transmitter clock units; and
    determining a difference between the arrival time in UWB transmitter clock units and the arrival time in UWB receiver clock units, wherein the processor of the UWB receiving systems adjusts the low precision resonator using the determined difference.

12. The system of claim 11, the processor of the UWB receiving system calculates adjustments based partially on temperature to better predict drift of low precision resonator.

13. The system of claim 1, further comprising at least one intermediary transceiver between the UWB transmitting system and the UWB receiving system, wherein the at least one intermediary transceiver receives the message from the UWB transmitting system and retransmits the message to the UWB receiving system.

14. The system of claim 13:
    wherein the at least one intermediary transceiver comprises more than one intermediary transceivers between the UWB transmitting system and the UWB receiving system; and
    wherein each of the more than one intermediary transceivers communicate with a next intermediary transceiver and enable an oscillator at the UWB receiving system to synchronize with the high precision clock at the UWB transmitting system.

15. The system of claim 14:
    wherein each of the more than one intermediary transceivers extracts a departure time from a received message at the more then on intermediary transceivers and determines an arrival time of the received message; and wherein the each of the more than one intermediary transceivers transmits a new message including a departure time represented in UWB transmitter clock units.

16. The system of claim 15:
wherein each of the more than one intermediary transceivers functions as both a UWB transmitter and a UWB receiver; and
wherein each of the more than one intermediary transceiver synchronizes an associated oscillator to the UWB transmitter clock and transmits periodic messages to synchronize the low precision resonator of the UWB receiving system with a clock of the intermediary transceiver.

17. A method for maintaining clock synchronization in a system, the system including an ultra-wideband (UWB) transmitting system and a UWB receiving system, the method comprising:
producing a high precision clock frequency at a high precision input clock of the UWB transmitting system;
receiving the high precision clock frequency at a UWB transmitter;
sending a message using a transmit antenna associated with the UWB transmitter, the message including a transmit time of the message in UWB transmitter clock units;
precisely controlling transmit times of messages sent from the UWB transmitter using a counter;
receiving the message at a UWB receiver of the UWB receiving system using a receive antenna associated with the UWB receiver from the UWB transmitter, the message being received at an arrival time in UWB receiver clock units;
calculating an oscillator adjustment for a low precision resonator based on the transmit time in the message and the arrival time; and
adjusting the low precision resonator using the calculated oscillator adjustment to synchronize the low precision resonator with the high precision input clock at the UWB transmitting system.

18. The method of claim 17, further comprising driving the low precision resonator using an oscillator circuit, wherein the receiving system includes an internal feedback amplifier.

19. The method of claim 18, further comprising receiving instructions from the UWB receiving system to adjust a frequency of the oscillator circuit.

20. The method of claim 17, further comprising:
calculating an updated oscillator adjustment for the low precision resonator based on the transmit time in the message, the arrival time of the message and captured transmissions associated therewith; and
adjusting the low precision resonator using the calculated oscillator adjustment such that low precision resonator remains synchronized with the high precision input clock at the UWB transmitting system.

* * * * *